United States Patent [19]

Hansen et al.

[11] Patent Number: 4,865,855
[45] Date of Patent: Sep. 12, 1989

[54] ANTIMICROBIAL ABSORBENT FOOD PAD

[75] Inventors: Richard E. Hansen, Roswell; Carl G. Rippl, Woodstock; David G. Midkiff, Alpharetta; Joseph G. Neuwirth, Cumming, all of Ga.

[73] Assignee: Kimberly-Clark Corporation, Neenah, Wis.

[21] Appl. No.: 142,383

[22] Filed: Jan. 11, 1988

[51] Int. Cl.$^4$ .............................................. B65D 81/26
[52] U.S. Cl. ..................... 426/124; 206/204; 426/129; 426/326
[58] Field of Search ............... 426/106, 124, 129, 326; 206/204; 428/119, 137

[56] References Cited

U.S. PATENT DOCUMENTS

| | | | |
|---|---|---|---|
| 3,026,209 | 3/1962 | Niblack et al. | 426/124 |
| 3,156,402 | 12/1963 | Dupuis | 206/204 |
| 3,577,258 | 5/1971 | Sincavage et al. | 426/129 |
| 3,940,062 | 2/1976 | Rainey | 426/124 |
| 4,124,116 | 11/1978 | McCabe | 206/204 |
| 4,237,171 | 12/1980 | Laage et al. | 426/129 |
| 4,275,811 | 6/1981 | Miller | 206/204 |
| 4,321,997 | 3/1982 | Miller | 206/204 |
| 4,382,507 | 5/1983 | Miller | 206/204 |
| 4,407,897 | 10/1983 | Farrell et al. | 206/204 |
| 4,410,578 | 10/1983 | Miller | 206/204 |
| 4,425,410 | 1/1984 | Farrell et al. | 206/204 |
| 4,464,443 | 7/1984 | Farrell et al. | 206/204 |
| 4,551,377 | 11/1985 | Elves et al. | 426/129 |
| 4,576,278 | 3/1986 | Laiewski et al. | 426/326 |
| 4,604,313 | 5/1986 | McFarland et al. | 428/172 |
| 4,615,937 | 10/1986 | Bouchette | 428/288 |

FOREIGN PATENT DOCUMENTS 1150681 7/1983 Canada .
2169514A 7/1986 United Kingdom .

OTHER PUBLICATIONS

CRC Handbook of Food Additives, Second Edition, vol. I, published by the CRC Press, Inc., 1972 (pp. 120-122).

Primary Examiner—George Yeung
Attorney, Agent, or Firm—William D. Herrick

[57] ABSTRACT

There is disclosed an absorbent food pad which absorbs exudate from food products in a package and inhibits the propagation of food-borne pathogens. The absorbent food pad contains an effective amount of an antimicrobial composition of one or more acids having the structure:

R—COOH where R is selected from the group consisting of lower alkyl; substituted lower alkyl; carboxy lower alkyl; carboxy, hydroxy lower alkyl; carboxy, halo lower alkyl; carboxy, dihydroxy lower alkyl, dicarboxy, hydroxy lower alkyl; lower alkenyl; carboxy lower alkenyl; dicarboxyl lower alkenyl; phenyl and substituted phenyl groups. In addition, the antimicrobial composition may include an anionic surfactant. More particularly, the antimicrobial composition comprises a mixture of citric acid, malic acid, and sodium lauryl sulfate in a rate ratio of 10:5:2 by weight respectively. The antimicrobial composition is disbursed within the absorbent medium of the absorbent food pad at a concentration of between 0.04% and 0.6% of the weight of the exudate that the pad is designed to absorb.

36 Claims, 3 Drawing Sheets

U.S. Patent  Sep. 12, 1989  Sheet 1 of 3  4,865,855

ANTIMICROBIAL ABSORBENT FOOD PAD

BACKGROUND OF THE INVENTION

The present invention relates generally to food packages, and more particularly concerns an antimicrobial absorbent pad for food products, particularly meat and poultry products.

Traditionally perishable food products such as meat, poultry, fish, and vegetables have been displayed and sold in bulk form, thereby allowing the purchaser to select the item or items to be purchased. This practice was particularly true with respect to meat and poultry products which were most commonly sold by a butcher from a display case. More recently such food products are prepackaged for display and sale. Such packaging, especially with respect to meat and poultry, involves the use of a semi-rigid tray, usually plastic, to contain the food product and a plastic overwrap to seal the product within the tray to maintain the freshness of the contents for a finite period.

Meat and poultry as well as other perishable food products naturally contain liquids and juices and occasionally added water which, with time, will drain from the product. When such food products are packaged within a plastic wrapped tray, these liquids may collect within the tray and may subsequently leak during transportation and handling. Market analysis has also revealed that the consumer finds the existence of free liquid in such packages to be unappealing. Consequently, many such packages today employ an absorbent material in the bottom of the tray to absorb the liquids as they are released from the food product. Whether the liquids from the food products remain free or are absorbed in a pad, such liquids provide a medium for bacterial propagation and for transmitting foodborne pathogens which cause disease in humans.

U.S. Pat. No. 4,576,278 to Laiewski discloses a tray which has a false bottom covering an exudate reservoir. The false bottom is made from a perforated liquid-impermeable thermoplastic film such as polyethylene. The reservoir's volume is maintained by integral standoffs which support the false bottom. An absorbent pad containing a bacteriostatic or bactericidal agent may be placed in the reservoir to inhibit or kill bacteria found in the exudate. Listed bacterial agents include broad spectrum antibiotics such as tetracyclines; penicillin; sorbic acid; alkyl-substituted or alkyl aryl-substituted quaternary ammonium compounds; chlorine containing compounds; iodine compounds; phenol and its derivatives; dehydroactic acid; peroxygen compounds; potassium persulfate; peracetic acid and sodium perborate. The bacterial agents may be applied to the absorbent material in any conventional manner. Because the tray has a false bottom and standoffs, there is no need for the absorbent pad in the reservoir to be constructed to insure that the bacterial agent does not contact the food product.

U.S. Pat. No. 4,738,847 to Roth, Creagan and Speigelberg discloses a multi-ply absorbent product, particularly a facial tissue with virucidal properties. The virucidal composition includes citric acid, malic acid, mixtures of citric acid and malic acid, and combinations of these with sodium lauryl sulfate. The tissue is formed with the virucidal composition confined to an inner layer in order to reduce direct contact between the user's skin and the virucidal composition. The tissue is formed of three plies of crepe wadding which typically has low wet strength. While the multi-ply tissue is designed to keep the virucidal agent from the user's skin, that result is achieved in part by the transitory use of the tissue. If the tissue were left in a liquid, the virucidal composition would rapidly migrate to the tissue's surface.

A liquid absorbing and concealing device which includes both a liquid absorbing bag and a flat bottom tray is disclosed in DuPuis, U.S. Pat. No. 3,156,402. The liquid absorbing bag is composed of two superposed sheets of material which are sealed by heat welding or adhesive around their marginal edges. The sheets may be formed from liquid impervious material such as waxed paper, cellophane, polyethylene, or other thermoplastic or thermosetting plastic materials. Each of the sheets contains a series of openings or holes to permit fluid from the food product to enter the bag from either the top or the bottom by means of gravity and capillary action.

A receptacle for moisture-exuding food products is described in U.S. Pat. No. 4,321,997 and U.S. Pat. No. 4,410,578 both to Miller. The receptacle comprises a supporting member such as a tray or bag and an absorbent pad associated therewith. The absorbent pad comprises a mat of liquid-absorbent material such as wood fluff, an upper liquid-impermeable plastic sheet overlying the absorbent mat, and a bottom plastic sheet underlying the absorbent mat. At least one of the sheets is perforated, and a rigid spacer is disposed between the two sheets to maintain their separation under a compressive load such that the ability of the pad to absorb liquids is unimpaired when the pad is subjected to compressive loading from the food product resting thereon. In this construction, it is preferred that only the bottom sheet be perforated such that when a food product is positioned upon the upper sheet of the absorbent pad, any exuded liquids will flow around the pad and enter the mat by capillary action through the perforated openings in the bottom sheet so as to hold the liquids out of contact with the food product to minimize contamination of the product and maintain its appearance and improve its shelf life.

A receptacle and absorbent pad for containing and displaying food products which tend to exude juices or liquids are disclosed in U.S. Pat. Nos. 4,275,81 and 4,382,507, both to Miller. The pad comprises a mat of liquid absorbent material, an upper liquid impermeable sheet overlying the absorbent mat and a perforated bottom sheet underlying the absorbent mat. When a food product is positioned upon the upper sheet of the absorbent pad, the exuded liquids flow around the pad and enter the mat by capillary action through the perforated openings of the bottom sheet and the liquids are held out of contact with the food product by the impermeable upper sheet. In preferred embodiments the absorbent mat is composed of a relatively thick layer of wood fluff and a relatively thin layer of tissue-like paper wadding which may be interconnected by embossing. In addition, various additives may be added to increase liquid absorbency.

The primary function of each of the above-described devices is to absorb the fluids which are exuded from packaged food products. Leaky packages are among the foremost complaints received by food store operators. Their use in such products, therefore, adds to the cost of the overall products. As a result, a major driving force in the development of such products is to provide an absorbent structure which provides ample absorbency while employing cost-efficient components. Furthermore, such designs should yield products with good wet strength, resilience, and fluid retention characteristics. Products such as tissue tend to break apart when wetted. Such materials also readily release their absorbed fluids when placed under a compressive load. This most notably happens when packages are stacked one upon the other. Finally, such absorptive structures can serve as an additional site for the propagation of bacteria and other food contaminants unless properly treated.

SUMMARY OF THE INVENTION

It is an object of the present invention to provide an absorbent food pad which will absorb and hold exudate from a food product in a package and which is impregnated with an antimicrobial agent that will kill or inhibit the growth and spread of food-borne pathogens found in the exudate.

It is likewise an object of the present invention to provide an absorbent food pad which will confine the antimicrobial agent and absorbed liquid so that they will not come in contact with the food product.

It is further an object of the present invention to provide an absorbent food pad in which the antimicrobial agent will kill bacteria, mold, and yeast and may be ingested without adverse effect. Particularly, the antimicrobial agent consists of acids found in natural foods which acids are an integral part of human cellular metabolic pathways.

The foregoing objectives are achieved by an absorbent food pad which in one embodiment has a liquid impervious film top layer and a bonded absorbent layer treated with an effective amount of an antimicrobial composition comprising one or more acids having the structure:

R-COOH where R is selected from the group consisting of lower alkyl; substituted lower alkyl; carboxy lower alkyl; carboxy, hydroxy lower alkyl; carboxy, halo lower alkyl; carboxy, dihydroxy lower alkyl, dicarboxy, hydroxy lower alkyl; lower alkenyl; carboxy lower alkenyl; dicarboxy lower alkenyl; phenyl and substituted phenyl groups. The antimicrobial composition also includes a surfactant. A particular antimicrobial composition includes citric acid, malic acid, and sodium lauryl sulphate in a ratio by weights of 10:5:2 respectively. The antimicrobial composition is disbursed within the absorbent medium at a concentration of 0.04% to 0.6% of the weight of the exudate that the pad is designed to absorb.

In another embodiment of the present invention, the pad includes a liquid impervious top film with single vent hole therein, a liquid impervious bottom film with a hole or slit pattern therein, and an absorbent sandwiched there between and impregnated with the above described antimicrobial composition.

In a third embodiment, the pad includes a liquid impervious top film with a hole or slit pattern and an attached absorbent impregnated with an antimicrobial composition as previously described. The impervious top film is bonded to the sides of a food tray to form a bottom for the food tray.

The invention also contemplates adding the antimicrobial composition described above to existing absorbent pads particularly by impregnating the absorbent medium of such existing pads with the antimicrobial composition. Particularly, such existing pads are suitable for incorporation of the bacteriacidal composition where such pads are designed to retain the exudate from the food product within the pad and keep the antimicrobial composition from mixing with the exudate and then coming into contact with the food product.

Other objects and advantages of the invention will become apparent upon reading the following detailed description and upon reference to the drawings.

DETAILED DESCRIPTION OF THE INVENTION

While the invention will be described in connection with a preferred embodiment, it will be understood that I do not intent to limit the invention to that embodiment. On the contrary, I intent to cover all alternatives, modifications, and equivalents that may be included within the spirit and scope of the invention as defined by the appended claims.

Figure 1:
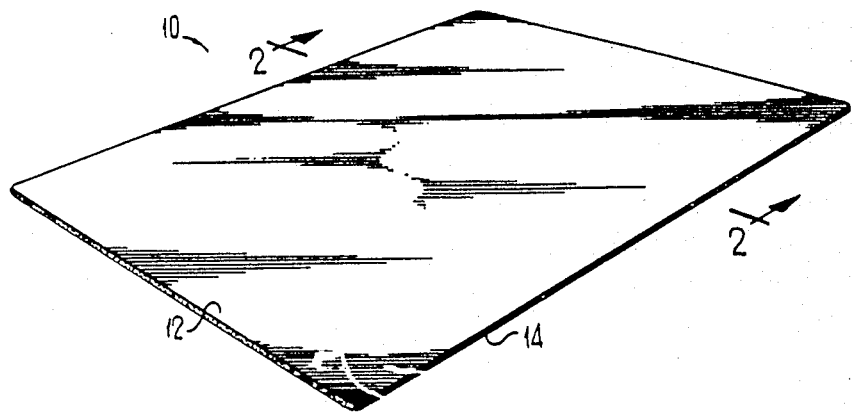
FIG. 1 is a perspective view of a first embodiment of the absorbent food pad of the present invention.
Figure 2:
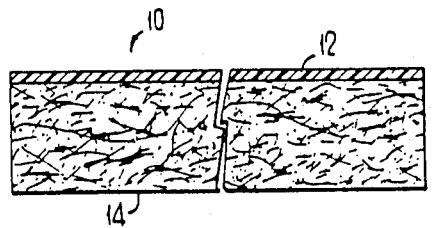
FIG. 2 is a cross section of the absorbent food pad shown in FIG. 1 as seen along lines 2—2 of FIG. 1.

Turning to FIG. 1, there is shown an absorbent food pad 10 embodying the present invention. The absorbent food pad 10 is rectangular in shape so as to fit conveniently into a plastic tray in which food products may be packaged. The absorbent food pad 10 consists of a top layer 12 and a bottom layer 14 (FIG. 2). The top layer 12 is in contact with the food product and is a liquid impervious polymeric film. The polymeric film may be made from any number of polymers which are liquid impervious and compatible with food products. Such films may include polyethylene, polypropylene, and polyester. Polyethylene film of 0.5 mil. thickness is generally preferred. Instead of a separate polymeric film, the layer 12 may be an integral layer of polymeric material formed during the manufacture of the absorbent layer 14. Particularly, the film may result from melt-blowing thermoplastic fibers onto the layer 14 and remelting those thermoplastic fibers into an integral film. Melt-blowing thermoplastic fibers to form layers is considered conventional and well within the skill of those of ordinary skill in the art. Such skill is demonstrated by NRL Report 4364, "Manufacture of Super-Fine Organic Fibers", by V. A. Wendt, E. L. Boon, and C. D. Fluharty; NRL Report 5265, "An Improved Device for the Formation of Super-Fine Thermoplastic Fibers", by K. D. Lawrence, R. T. Lukas, and J. A. Young; and, U.S. Pat. No. 3,849,241, issued Nov. 19, 1974, to Buntin, et al.

The absorbent layer 14 may be any number of absorbent materials such as compressed fluff pulp, laminated tissue, or coform absorbent. The absorbent layer 14 is bonded to the film by adhesive, sonic bonding, or other suitable method. Coform absorbent is preferred for the absorbent layer 14. The production of the coform layer 14 is disclosed in Anderson et al. U.S. Pat. No. 4,100,324. The coform layer 14 may include combinations of natural and manmade fibers. The melt-blown fibers of the coform layer may be made from polypropylene, polyethylene, polyester, or nylon. Generally, polypropylene is preferred. The staple length fibers of the coform layer 14 may be cellulose, cotton, flax, jute, silk, polypropylene, polyethylene, polyester, rayon, or nylon. Because of its cost, cellulose is preferred in connection with an absorbent food pad. Particularly, the coform layer is preferrably an 80:20 mix of wood pulp to a polymer fibers When the coform layer 14 is composed of that mixture, the quantity of absorbent material in the coform layer is from 10% to 20% of the weight of the fluid the pad is intended to absorb from the food product.

In order to provide an absorbent food pad that will kill or inhibit the growth and spread of food borne pathogens, the absorbent layer 14 of the absorbent food pad 10 is impregnated with an antimicrobial composition which consists of a water soluble carboxylic acid and a surfactant. In general, the water soluble carboxylic acids useful in accordance with the invention have the following structure:

R-COOH

Wherein R may be represented by: lower alkyl; substituted lower alkyl; hydroxy lower alkyl (e.g. $HOCH_2-$); carboxy lower alkyl (e.g. $HOOC-CH_2-CH_2-$) carboxy, hydroxy lower alkyl (e.g., $HOOCCH_2CHOH-$); carboxy, halo lower alkyl (e.g. $HOOCCH_2CHBr-$); carboxy, dihydroxy lower alkyl (e.g. $HOOC-CHOH-CHOH$); dicarboxy, hydroxy lower alkyl $$\left[ \text{e.g.} HOOC-CH_2\underset{\underset{COOH}{|}}{\overset{\overset{OH}{|}}{C}}-CH_2- \right]$$

lower alkenyl, carboxy lower alkenyl (e.g. $HOOCCH=CH-$), dicarboxy lower alkenyl (e.g.

$$HOOC-CH2\underset{\underset{}{}}{\overset{\overset{COOH}{|}}{C}}=CH-),$$

phenyl (e.g. $C_6H_5-$); substituted phenyl (e.g. hydroxy phenyl $HO-C_6H_4-$). Other acid examples include hydroxy lower alkyl, e.g., lactic; carboxy, hydroxy lower alkyl, e.g. 2-methyl malic; carboxy, halo lower alkyl, e.g. 2-chloro-3-methyl succinic; carboxy, dihydroxy lower alkyl, e.g. 2-methyl tartaric; dicarboxy, hydroxy lower alkyl, e.g. 2-methyl citric acid; and carboxy lower alkenyl, e.g. fumaric. The above definitions are used in an illustrative but not a limiting sense. The term "lower" as used herein refers to an acid where "R" contains one to six carbon atoms. The term "substituted" indicates that one or more hydrogen atoms are substituted by halogen atoms (F,Cl,Br,I) hydroxyl groups, amino groups, thiol groups, nitro groups, cyano groups, etc.

The surfactant may be nonionic (e.g., the polyoxyethylenated alkylphenols such as TRITON X-100®, manufactured by Rohm and Haas; the polyoxyethylenated sorbitol esters such as TWEEN 40®, manufactured by ICI United States, Inc.), cationic (e.g. cetylpyridinium chloride ($C_5H_5+(CH_2)_{15}CH_3Cl-$), methylbenzethonium chloride $$(Me_3CCH_2C(Me)_2C_6H_3(Me)-OCH_2CH_2OCH_2CH_2{}^+N(Me)_2CH_2C_6H_5Cl-)$$

or anionic (e.g., sodium dodecyl sulfate, ($CH_3(CH_2)_{10}-CH_2OSO_3-Na$), the 1,4-bis (2-ethylhexyl) ester, sodium salt of sulfosuccinic acid, as manufactured by American Cyanamid Company under the tradename of AEROSOL OT. The preferred anionic surfactants may be represented by the structures:

1. $(ROSO_3)_xM^+$ or $(RSO_3)_xM^+$ wherein, $M+$ is a mono, di or trivalent metal cation or an ammonium or substituted ammonium ion; x is an integer; and R is an alkyl group.

$$2.\ M^+\left( -O_3S-\underset{\underset{CHCO_2R_2}{|}}{\overset{\overset{CH_2CO_2R_1}{|}}{}}\right)_x$$

wherein, $M^+$ and x are defined as above and $R_1$ and $R_2$ may be the same or different and may be represented by straight or branched chain aliphatic groups. The above anionic surfactants are presented in an illustrative rather than a limiting sense.

For the absorbent food pad of the present invention, a preferred antimicrobial composition is citric acid, malic acid, and sodium lauryl sulfate in a ratio by weight respectively of 10:5:2. The antimicrobial composition should be added to the absorbent layer 14 in sufficient concentration to kill commonly existing pathogens in food products such as salmonella, pseudomonas, and campylobacter. For the preferred composition, it has been found that effective levels result from adding the antimicrobial composition to the absorbent layer in quantities from 0.04% to 0.6% by weight of the liquid that the pad is designed to absorb.

In use, the absorbent food pad 10 is placed between the food product and the tray or other packaging material with the film layer 12 in contact with the food product. As the juices or liquids are released from the food product, they drain to the edge of the pad 10 and are absorbed by the underlying absorbent layer 14. Unlike simple wood pulp fluff, the coform material of absorbent layer 14 is more resistant to compression when wet due to the use of the synthetic fibers. As a result, the absorbent layer 14 is less likely to release its fluids when compressed. The film layer 12 provides a barrier to prevent the exudate, once absorbed in the absorbent layer 14, from recontacting the food product. Likewise, the film layer 12 keeps the antimicrobial composition from coming into direct contact with the food product in the first instance.

Figure 3:
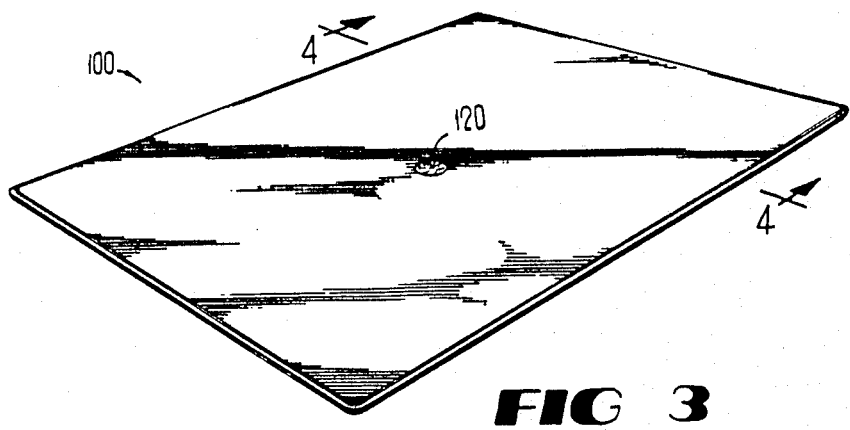
FIG. 3 is a perspective view of a second embodiment of an absorbent food pad of the present invention.
Figure 4:
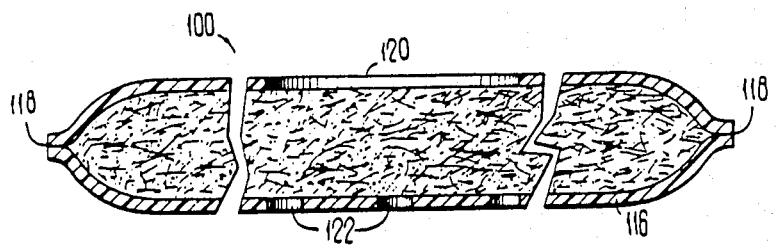
FIG. 4 is a cross sectional view of the absorbent food pad shown in FIG. 3 as seen along lines 4—4 of FIG. 3.
Figure 5:
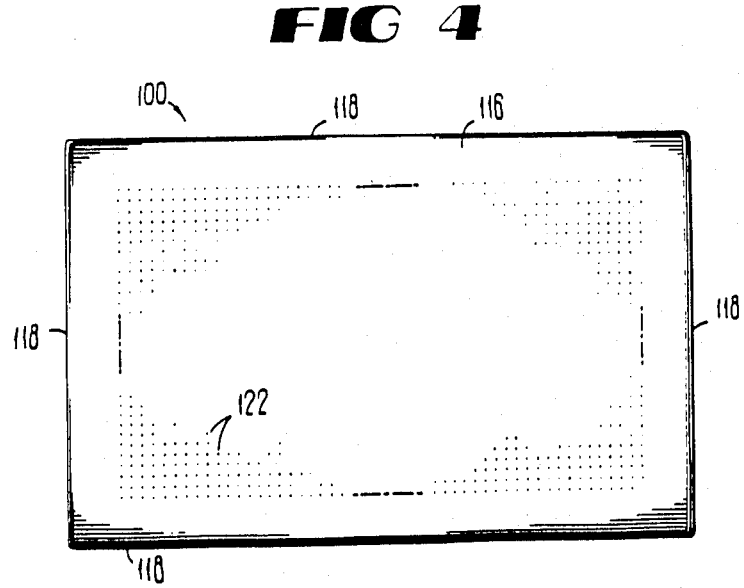
FIG. 5 is a bottom plan view of the absorbent food pad shown in FIG. 3.
Figure 6:
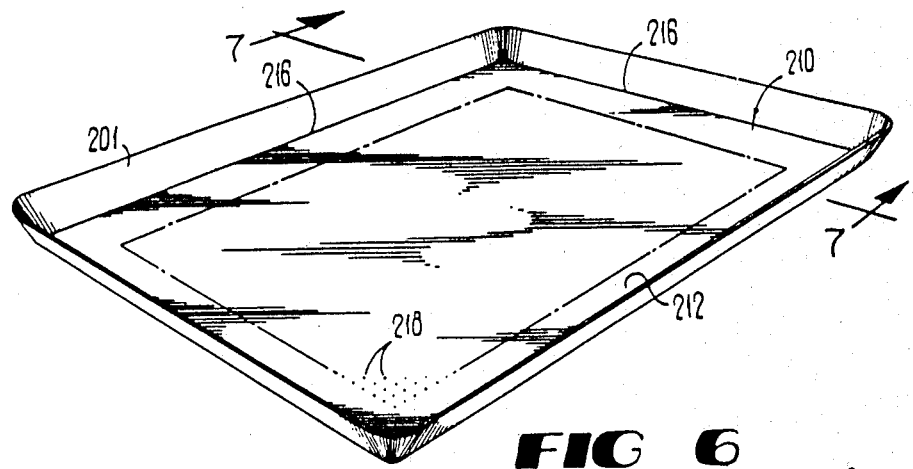
FIG. 6 is a perspective view of a third embodiment of a absorbent food pad of the present invention.
Figure 7:
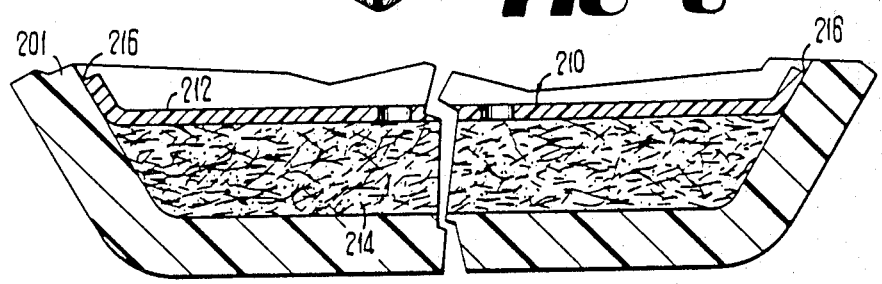
FIG. 7 is a cross sectional view of the absorbent food pad shown in FIG. 6 as seen along lines 7—7 of FIG. 6.
Figure 8:
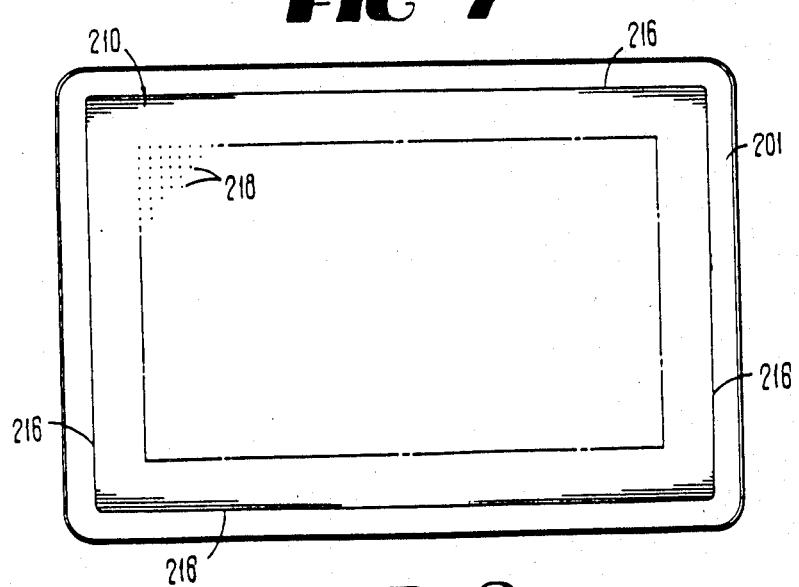
FIG. 8 is a top plan view of the absorbent food pad shown in FIG. 6.

Turning to FIGS. 3–5, there is shown a second embodiment of the present invention. Particularly, there is shown a food pad 100 comprising a top layer 112 formed of a liquid impervious film, an absorbent inner layer 114, and a bottom layer 116 formed of a liquid impervious film (FIG. 4). The top layer 112 is a layer of polymeric film which is in accordance with the polymeric films previously described. Likewise, the bottom layer 16 is a polymeric film. The absorbent inner layer 114 is constructed as previously described and preferably is coform material impregnated with the antimicrobial composition previously described.

The absorbent layer 114 is attached to both the top layer 112 and the bottom layer 116. The top layer 112 and the bottom layer 116 are bonded at their edges 118 to form an envelope for containing the coform inner layer 114. The top layer 112 which is in contact with the food product is uniform except for a vent hole 120 centrally located which allows exudate from the food product to pass through the film into the coform absorbent layer 114 and vents air from the absorbent layer. In addition, the bottom layer 116 is perforated with holes 122 approximately 0.02 inches in diameter and spaced 0.1 inches from each other or it has rows of slits 0.1 inches long and spaced approximately 0.25 inches from adjacent rows of slits. The holes or slits should not be closer than 0.5 inches to the sealed edges of the polymer envelope. The holes or slits in the bottom layer 116 allow exudate which has drained off of the side of the pad to be absorbed by wicking action through the bottom layer into the absorbent layer 114. The quantity of absorbent material may be reduced about 20% from the absorbent material used in the embodiment shown in FIGS. 1 and 2. Particularly, the quantity of absorbent medium in the layer 114 where co-form is used may be from about 8%–16% of the weight of the fluid the pad is intended to absorb.

Turning to FIGS. 3–8, there is shown a third embodiment of the present invention. Particularly, there is shown a conventional liquid impervious food tray 210 which has an absorbent food pad 200 permanently disposed along its bottom. The food tray 210 may be of any conventional material that is liquid impervious and compatible with the food products packaged therein. Such materials may include thermoplastic materials, foamed thermoplastic materials, paper board treated for liquid repellency, and the like. The food pad 200 consists of a top layer 212 and a lower absorbent layer 214. The top layer 212 is a polymeric film. The absorbent layer 214 is attached to the film layer 212 and may be any suitable absorbent, again preferably coform absorbent impregnated with the antimicrobial composition as previously described. The upper layer 212 of polymeric film is bonded to the tray 201 along continuous bonding lines 216. The film layer 212 is perforated with holes 218 which are approximately 0.02 inches in diameter and spaced 0.1 inches from each other and not closer than 0.5 inches from the sealed edges 216 of the film and tray. The holes 218 allow exudate from the food product placed on the film layer 212 to pass into and be absorbed by the coform absorbent 214 while inhibiting recontact between the food product and the exudate and antimicrobial composition so that deleterious effects on the food product including its taste and odor are avoided.

It should be appreciated that the present invention also contemplates a method of inhibiting the propagation of food-borne pathogens by treating existing absorbent food pads with an effective amount of the anitmicrobial composition previously described. Although the antimicrobial composition is not toxic to humans, it should, however, be kept from contact with the food product to avoid ingestion by the consumer. Consequently, the food absorbent pad should have a barrier layer which inhibits flow of liquids bearing the antimicrobial composition from the absorbent into contact with the food product.

The effectiveness of the present invention is illustrated by the following example. An absorbent food pad in accordance with the embodiment disclosed in FIGS. 1 and 2 was prepared having a 0.5 mil polyethylene top layer and a coform wood pulp/polypropylene (80/20) absorbent. Poultry samples were obtained from grocery stores in the Atlanta, Georgia area, and the conventional absorbent food pads packaged with those poultry samples were tested for the presence of salmonella. In approximately 35% of the absorbent pad samples, unclassified strains of salmonella were isolated.

A serial dilution test was made of a mixture of the antimicrobial composition, namely citric acid, malic acid, and sodium lauryl sulfate (10:5:2 by weight respectively), to determine the minimum bactericidal concentration for an aqueous solution of 98% water, 2% chicken blood, and 138 milligrams of cellulose fiber for $2.5 \times 10^6$ CFU of salmonella choloeraesuis per millimeter. In order to obtain the bactericidal effect within ten minutes and sixty minutes of exposure, the antimicrobial composition was required in concentrations of less than 0.6% by weight of the liquid to be collected by the absorbent food pad.

A second serial dilution test was made of the same antimicrobial composition to establish the minimum concentration required for significant reduction (99%) of the microbial loading using the same starting concentration of bacteria. It was found that the antimicrobial composition was required in concentrations of less than 0.04% by weight of liquid to be collected in the food absorbent pad to obtain effectiveness, i.e. greater than 99% kill within both ten minutes and sixty minutes. This antimicrobial action was maintained by the pad for at least twenty-four hours.

Similar tests were conducted with pseudomonas aeruginous and campylobacter jejuni and comparable results were obtained.

Circular samples of the absorbent material (2.4 square inches) were taken from a full sized food absorbent pad of the present invention which had been treated with the antimicrobial composition at approximately 0.6% of the liquid holding capacity. These samples were tested by titration to verify the availability of the correct amount of antimicrobial composition to consider the pad to be bactericidal. Matched samples were then tested for bactericidal efficacy using salmonella choleraesuis at $6.0 \times 10^6$ CFU per millimeter of liquid (98% water plus 2% chicken blood) applied to the sample pad. Both tests demonstrated that an absorbent food pad can be adequately treated with the antimicrobial composition of the present invention to make it bactericidal.

We claim:

1. An absorbent food pad positioned in a food tray for absorbing exudate from food therein comprising:
   a. a fluid impervious layer having a food contact side and a tray side; and
   b. an absorbent layer attached to the tray side of the fluid impervious layer and being impregnated with an effective amount of an antimicrobial composition comprising a surfactant and one or more acids having the structure:

R—COOH where R is selected from the group consisting of lower alkyl; substituted lower alkyl; carboxy lower alkyl; carboxy, hydroxy lower alkyl; carboxy, halo lower alkyl; carboxy, dihydroxy lower alkyl; dicarboxy, hydroxy lower alkyl; lower alkenyl; carboxy lower alkenyl; dicarboxy lower alkenyl; phenyl and substituted phenyl groups.

2. The pad of claim 1, wherein the said surfactant is selected from the group consisting of polyoxyethylenated alkyl phenols, polyoxyethylenated sorbitol esters, quartenary ammonium salts, or sulfuric acid ester salts and sulfosuccinic ester salts having a structure:

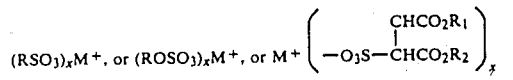

wherein $M^+$ is a mono, di or a trivalent metal cation or an ammonium or substituted ammonium ion, x is an integer; and R is an alkyl group, $R_1$ and $R_2$ are the same or different straight or branched chain aliphatic groups.

3. The pad of claim 1, wherein said surfactant is an anionic surfactant selected from the group consisting of alkyl sulfonate salts and alkyl sulfate salts.

4. The pad of claim 1, wherein the antimicrobial composition comprises the acid and an anionic surfactant selected from the group consisting of alkyl sulfonate salts and alkyl sulfate salts.

5. The pad of claim 4, wherein the surfactant is selected from the group consisting of the sodium salt of 1,4-bis(2-ethylhexyl) ester of sulfosuccinic acid and sodium dodecyl sulfate.

6. The pad of claim 1, wherein R is from one to six carbon atoms.

7. The pad of claim 1 or 4, wherein the acid is selected from the group consisting of citric, malic, succinic, benzoic, and substituted derivatives thereof, and mixtures of two or more said acids.

8. The pad of claim 1, wherein the absorbent layer consists of a coform sheet of wood pulp and polymer fibers.

9. The pad of claim 8, wherein the antimicrobial composition is added to the absorbent layer in an amount of from 0.04 percent to 0.6 percent of the weight of the exudate to be absorbed.

10. An absorbent food pad positioned in a food tray for absorbing exudate from food therein comprising:
 a. a top layer composed of a liquid impervious film and having an outside surface, an inside surface, peripheral edges, and a vent hole;
 b. a bottom layer composed of a liquid impervious film and having an outside surface, an inside surface, peripheral edges, and a number of holes; and
 c. an absorbent layer attached to the inside surface of the top and bottom layers and being impregnated with an effective amount of an antimicrobial composition comprising a surfactant and one or more acids having the structure:

R—COOH where R is selected from the group consisting of lower alkyl; substituted lower alkyl; carboxy lower alkyl; carboxy, hydroxy lower alkyl; carboxy, halo lower alkyl; carboxy, dihydroxy lower alkyl, dicarboxy, hydroxy lower alkyl; lower alkenyl; carboxy lower alkenyl; dicarboxy lower alkenyl; phenyl and substituted phenyl groups.

11. The pad of claim 10, wherein said surfactant is selected from the group consisting of polyoxyethylenated alkyl phenols, polyoxyethylenated sorbitol esters, quartenary ammonium salts, or sulfuric acid ester salts and sulfosuccinic ester salts having a structure:

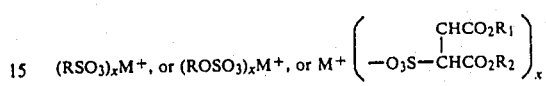

wherein $M^+$ is a mono, di or a trivalent metal cation or an ammonium or substituted ammonium ion, x is an integer; and R is an alkyl group, $R_1$ and $R_2$ are the same or different straight or branched chain aliphatic groups.

12. The pad of claim 10, wherein said surfactant is an anionic surfactant selected from the group consisting of alkyl sulfonate salts and alkyl sulfate salts.

13. The pad of claim 10, wherein the antimicrobial composition comprises the acid and an anionic surfactant selected from the group consisting of alkyl sulfonate salts and alkyl sulfate salts.

14. The pad of claim 13, wherein the surfactant is selected from the group consisting of the sodium salt of 1,4-bis(2-ethylhexyl) ester of sulfosuccinic acid and sodium dodecyl sulfate.

15. The pad of claim 10, wherein R is from one to six carbon atoms.

16. The pad of claim 10, wherein the acid is selected from the group consisting of citric, malic, succinic, benzoic, and substituted derivatives thereof, and mixtures of two or more said acids.

17. The pad of claim 10, wherein the absorbent layer consists of a coform sheet of wood pulp and polymer fibers.

18. The pad of claim 17, wherein the antimicrobial composition is added to the absorbent layer in an amount of from 0.04 percent to 0.6 percent of the weight of the exudate to be absorbed.

19. A food container comprising:
 a. a liquid impervious tray having sides and a bottom; and
 b. an absorbent food pad positioned in the bottom of the tray and comprising:
  i. a top layer composed of a liquid impervious film and having a food contact side, a tray side, peripheral edges which are attached to the sides of the tray, and a number of holes; and
  ii. an absorbent layer attached to the tray side of the top layer and being impregnated with an effective amount of an antimicrobial composition comprising a surfactant and one or more acids having the structure:

R—COOH where R is selected from the group consisting of lower alkyl; substituted lower alkyl; carboxy lower alkyl; carboxy, hydroxy lower alkyl; carboxy, halo lower alkyl; carboxy, dihydroxy lower alkyl; dicarboxy, hydroxy lower alkyl; lower alkenyl; carboxy lower alkenyl; dicarboxy lower alkenyl; phenyl and substituted phenyl groups.

20. The pad of claim 19, wherein said surfactant is selected from the group consisting of polyoxyethylenated alkyl phenols, polyoxyethylenated sorbitol esters, quartenary ammonium salts, or sulfuric acid ester salts and sulfosuccinic ester salts having a structure:

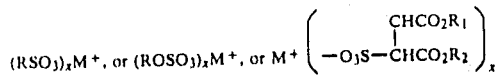

wherein $M^+$ is a mono, di or a trivalent metal cation or an ammonium or substituted ammonium ion, x is an integer; and R is an alkyl group, $R_1$ and $R_2$ are the same or different straight or branched chain aliphatic groups.

21. The pad of claim 19, wherein said surfactant is an anionic surfactant selected from the group consisting of alkyl sulfonate salts and alkyl sulfate salts.

22. The pad of claim 19, wherein the antimicrobial composition comprises the acid and an anionic surfactant selected from the group consisting of alkyl sulfonate salts and alkyl sulfate salts.

23. The pad of claim 22, wherein the surfactant is selected from the group consisting of the sodium salt of 1,4-bis(2-ethylhexyl) ester of sulfosuccinic acid and sodium dodecyl sulfate.

24. The pad of claim 19, wherein R is from one to six carbon atoms.

25. The pad of claim 19 or 22, wherein the acid is selected from the group consisting of citric, malic, succinic, benzoic, and substituted derivatives thereof, and mixtures of two or more said acids.

26. The pad of claim 19, wherein the absorbent layer consists of a coform sheet of wood pulp and polymer fibers.

27. The pad of claim 26, wherein the antimicrobial composition is added to the absorbent layer in an amount of from 0.04 percent to 0.6 percent of the weight of the exudate to be absorbed.

28. A method for inhibiting the propagation of food-borne pathogens in a food container containing a food product comprising the steps of:
 a. providing a food absorbent pad having an absorbent medium for absorbing exudate from the food product and a fluid barrier between the absorbent medium and the food product; and
 b. treating the absorbent medium with an effective amount of an antimicrobial composition comprising a surfactant and one or more acids having the structure:

R—COOH where R is selected from the group consisting of lower alkyl; substituted lower alkyl; carboxy lower alkyl; carboxy, hydroxy lower alkyl; carboxy, halo lower alkyl; carboxy, dihydroxy lower alkyl; dicarboxy, hydroxy lower alkyl; lower alkenyl; carboxy lower alkenyl; dicarboxy lower alkenyl; phenyl and substituted phenyl groups.

29. The method of claim 28, wherein said surfactant is selected from the group consisting of polyoxyethylenated alkyl phenols, polyoxyethylenated sorbitol esters, quartenary ammonium salts, or sulfuric acid ester salts and sulfosuccinic ester salts having a structure:

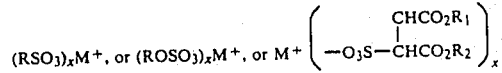

wherein $M^+$ is a mono, di or a trivalent metal cation or an ammonium or substituted ammonium ion, x is an integer; and R is an alkyl group, $R_1$ and $R_2$ are the same or different straight or branched chain aliphatic groups.

30. The method of claim 28, wherein said surfactant is an anionic surfactant selected from the group consisting of alkyl sulfonate salts and alkyl sulfate salts.

31. The method of claim 28, wherein the antimicrobial composition comprises the acid and an anionic surfactant selected from the group consisting of alkyl sulfonate salts and alkyl sulfate salts.

32. The method of claim 31, wherein the surfactant is selected from the group consisting of the sodium salt of 1,4-bis(2-ethylhexyl) ester of sulfosuccinic acid and sodium dodecyl sulfate.

33. The method of claim 28, wherein R is from one to six carbon atoms.

34. The method of claim 28 or 31, wherein the acid is selected from the group consisting of citric, malic, succinic, benozic, and substituted derivatives thereof, and mixtures of two or more said acids.

35. The method of claim 28, wherein the absorbent layer consists of a coform sheet of wood pulp and polymer fibers.

36. The method of claim 35, wherein the anitmicrobial composition is added to the absorbent medium in an amount of from 0.04 percent to 0.6 percent of the weight of the exudate to be absorbed.

* * * * *